United States Patent
Eggebrecht et al.

(10) Patent No.: US 10,672,102 B2
(45) Date of Patent: Jun. 2, 2020

(54) CONVERSION AND PRE-PROCESSING OF SPHERICAL VIDEO FOR STREAMING AND RENDERING

(71) Applicant: HULU, LLC, Santa Monica, CA (US)

(72) Inventors: Julian Eggebrecht, San Rafael, CA (US); Thomas Engel, San Anselmo, CA (US); Jens Petersam, Cologne (DE)

(73) Assignee: HULU, LLC, Santa Monica, CA (US)

(*) Notice: Subject to any disclaimer, the term of this patent is extended or adjusted under 35 U.S.C. 154(b) by 178 days.

(21) Appl. No.: 15/464,883

(22) Filed: Mar. 21, 2017

(65) Prior Publication Data

US 2017/0270634 A1    Sep. 21, 2017

Related U.S. Application Data

(60) Provisional application No. 62/311,263, filed on Mar. 21, 2016.

(51) Int. Cl.
*H04N 13/00* (2018.01)
*G06T 3/00* (2006.01)
(Continued)

(52) U.S. Cl.
CPC ............ *G06T 3/0043* (2013.01); *G06T 15/04* (2013.01); *G06T 15/205* (2013.01); *G06T 19/20* (2013.01);
(Continued)

(58) Field of Classification Search
CPC ....... G06T 15/04; G06T 15/205; G06T 19/20; G06T 2210/36; G06T 2219/2008;
(Continued)

(56) References Cited

U.S. PATENT DOCUMENTS

| | | | |
|---|---|---|---|
| 9,094,615 B2 * | 7/2015 | Aman | G01S 3/7864 |
| 2003/0068098 A1 * | 4/2003 | Rondinelli | G06T 3/0062 |
| | | | 382/276 |

(Continued)

FOREIGN PATENT DOCUMENTS

GB    2524250 A    9/2015

OTHER PUBLICATIONS

International Search Report and Written Opinion for International Appln. No. PCT/US2017/023415 dated Jun. 15, 2017, 13 pages.

(Continued)

*Primary Examiner* — Md N Haque
(74) *Attorney, Agent, or Firm* — Fountainhead Law Group, PC

(57) ABSTRACT

In one embodiment, a method receives spherical content for video and generates face images from the spherical content to represent an image in the video. A two dimensional sheet for the face images is generated. A size of the face images is reduced and a pixel frame around each of the plurality of face images is added on the sheet. Also, a plurality of gaps are added on the sheet in between edges of the face images that are neighboring. The method then adds gap content in the plurality of gaps where the gap content is based on content in an area proximate to the plurality of gaps. The method encodes the face images, the pixel frame, and gap content on the sheet and sends the encoded sheet to a decoder. The face images are decoded for placement on an object structure to display the spherical content.

21 Claims, 11 Drawing Sheets

(51) Int. Cl.
*H04N 13/139* (2018.01)
*H04N 13/194* (2018.01)
*G06T 15/20* (2011.01)
*G06T 15/04* (2011.01)
*H04N 13/117* (2018.01)
*H04N 13/189* (2018.01)
*H04N 13/161* (2018.01)
*G06T 19/20* (2011.01)
*H04N 7/01* (2006.01)

(52) U.S. Cl.
CPC ......... *H04N 7/0117* (2013.01); *H04N 13/117* (2018.05); *H04N 13/139* (2018.05); *H04N 13/161* (2018.05); *H04N 13/189* (2018.05); *H04N 13/194* (2018.05); *G06T 2210/36* (2013.01); *G06T 2219/2008* (2013.01)

(58) Field of Classification Search
CPC .. G06T 3/0043; H04N 13/139; H04N 13/161; H04N 13/189; H04N 13/194; H04N 7/0117
See application file for complete search history.

(56) References Cited

U.S. PATENT DOCUMENTS

| | | | |
|---|---|---|---|
| 2006/0187305 A1* | 8/2006 | Trivedi | G06K 9/00234 348/169 |
| 2007/0002131 A1* | 1/2007 | Ritchey | H04N 5/232 348/39 |
| 2012/0113209 A1* | 5/2012 | Ritchey | H04N 5/2254 348/14.02 |
| 2012/0154684 A1* | 6/2012 | Luo | G11B 27/034 348/700 |
| 2013/0322843 A1* | 12/2013 | Suzuki | G11B 27/322 386/230 |
| 2014/0118482 A1 | 5/2014 | Noh et al. | |
| 2014/0152655 A1* | 6/2014 | Johnston | G06F 3/011 345/419 |
| 2015/0172544 A1 | 6/2015 | Deng et al. | |
| 2015/0264259 A1* | 9/2015 | Raghoebardajal | G06T 3/0062 348/36 |
| 2015/0297949 A1* | 10/2015 | Aman | G06F 16/70 348/157 |
| 2015/0341552 A1 | 11/2015 | Chen et al. | |
| 2017/0208292 A1* | 7/2017 | Smits | H04N 13/243 |

OTHER PUBLICATIONS

Supplementary Partial European Search Report for European Appln. No. 17770989.6 dated Aug. 8, 2019, 18 pages.

\* cited by examiner

CONVERSION AND PRE-PROCESSING OF SPHERICAL VIDEO FOR STREAMING AND RENDERING

CROSS REFERENCE TO RELATED APPLICATIONS

The present disclosure claims priority to U.S. Provisional App. No. 62/311,263, entitled "Conversion Pre-Processing to Optimize 360 Degree Spherical Video for Streaming and Display", filed Mar. 21, 2016, the contents of which is incorporated herein by reference in its entirety.

BACKGROUND

A common format to encode 360 degree virtual reality (VR) content into a classic, rectangular two dimensional (2D) image is using an "equirectangular" format. Similar to classic map projections used in cartography, the equirectangular format aims to represent data from the surface of a sphere as accurately as possible by giving all areas of the sphere a similar area on the rectangular surface of the 2D image.

The resulting 2D image features the original content with severely distorted straight lines, which may be similar to the distorted lines in an extreme wide angle photo. The distorted lines may be decoded into an un-distorted three dimensional (3D) image at viewing time; however, the distorted lines present particular difficulties when encoding the image as part of a video. For example, the distorted nature of the image leads to increased data being needed to represent the video in encoded format at a given quality. The additional data required increases the data that needs to be encoded, which uses more bandwidth making it a challenge to offer the video for the virtual reality experience at an acceptable bandwidth for streaming. Further, when the virtual reality experience is stereoscopic (e.g., individual images for each eye), the problem is exacerbated because image data for each eye needs to be encoded and transmitted.

DETAILED DESCRIPTION

Described herein are techniques for a video processing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide users using a video delivery service a virtual reality experience for streaming video. The system uses a cube map to represent a spherical environment around a virtual reality device. The cube map represents the original spherical content by projecting the data to a set of face images, such as onto the six faces of a cube. The cube map can be decoded when presented to a user of the system and the decoded image includes a very low level of distortion. The system pre-processes the content before the content is encoded to improve the encoding and decoding processes. For example, the pre-processing receives a rectangular two dimensional (2D) image in an "equirectangular" format from a content provider. The pre-processing decodes the equirectangular data to generate face images, such as six face images, from the original spherical content. The face images represent images that can be places on different faces of an object, such as a cube. The six face images are arranged in a cube map on a sheet to maximize the encoding gains. For example, the pre-processing aligns the edges of the face images that have natural boundaries next to each other on the sheet. Also, the pre-processing add gaps between some edges of neighboring face images to avoid any encoding artifacts at edge boundaries of the face images. The face images may be slightly downsized to allow for insertion of pixels from logically neighboring cube map faces. These additional pixels are generated to also allow the use of bilinear filtering at render time. In one embodiment, particular embodiments further add additional images (e.g., mip-maps) to avoid aliasing artifacts during rendering.

Figure 1:
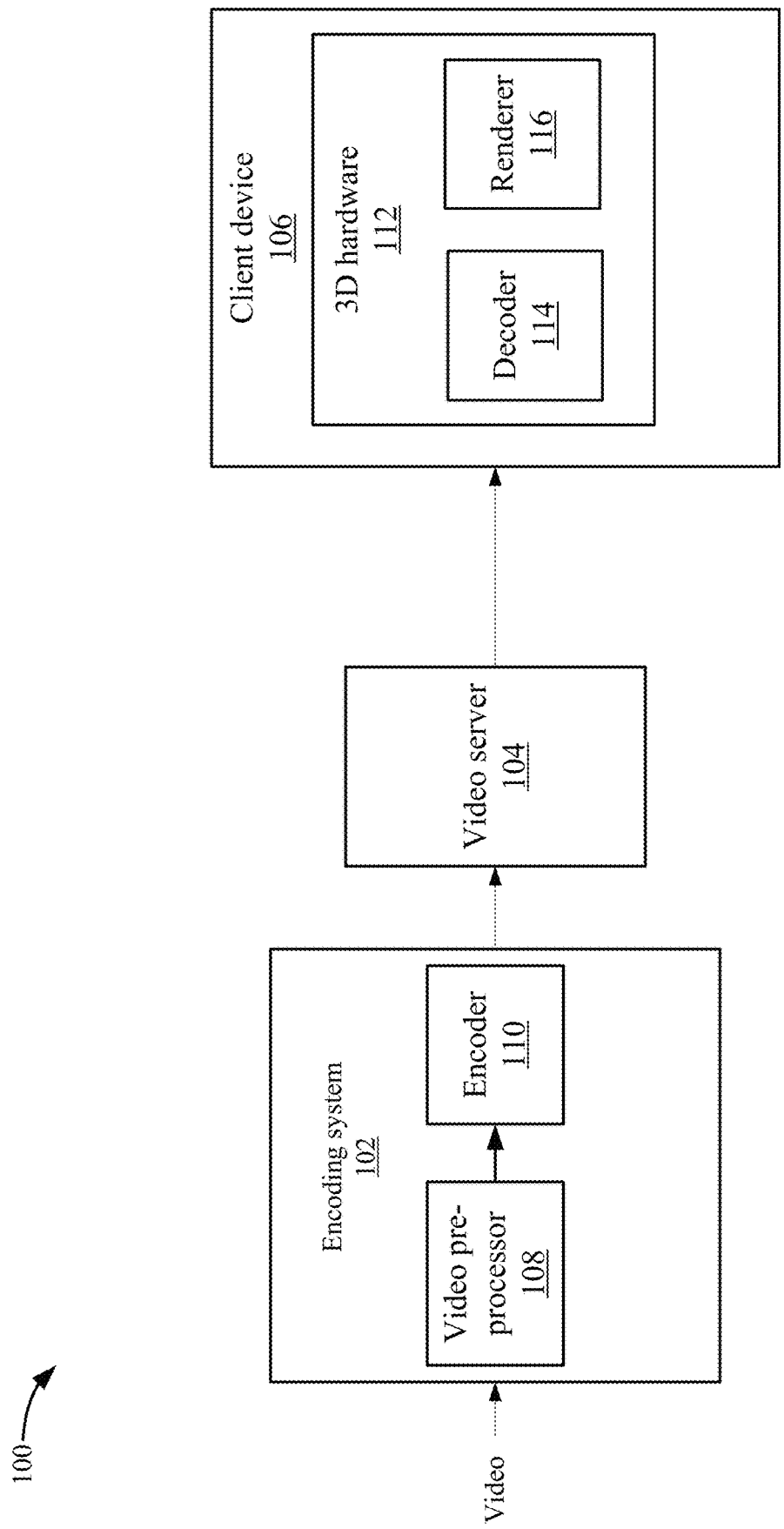
FIG. 1 depicts a simplified system for providing virtual reality content according to one embodiment.

FIG. 1 depicts a simplified system 100 for providing virtual reality content according to one embodiment. System 100 includes an encoding system 102, video server 104, and client device 106. System 100 receives spherical content (e.g., 360 degree virtual reality (VR) content) from a content provider and can provide a 360 degree virtual reality experience at client device 106. The spherical content allows a user to view the video in 360 degrees.

Encoding system 102 includes a video pre-processor 108 that receives and pre-processes the video before the video is encoded by an encoder 110. In one embodiment, video pre-processor 108 receives spherical content in a format, such as rectangular two dimensional (2D) images in an "equirectangular" format, from a content provider. Video pre-processor 108 decodes the equirectangular data into face images for a map, such as a cube map. The face images include the content from the original spherical content. A cube map arranges the face images on a sheet that can be encoded. The cube map that can then be decoded when presented to a user by placing the face images on an object, such as a cube structure. A collection of six face images making up a cube map may be much better suited to be compressed and offers low levels of distortions to the images. Then, encoder 110 encodes the cube map of the video. Encoder 110 may be a standard encoder using one of the encoding standards. Alterations to encoder 110 may not be necessary even though the conversion process was performed. Video server 104 can then send the compressed video stream to client device 106.

3-Dimensional (3D) hardware 112 in client device 106 includes a decoder 114 and renderer 116. Decoder 114 decodes the compressed video that was encoded as the cube map. Decoder 114 decodes the cube map into the cube format at rendering time. For example, the six face images are decoded. Then, a renderer 116 can render the face images on using the cube structure. The rendered face images provide the 3D video to a user viewing the video. A user using client 106 can then view the spherical content using client 106. In one embodiment, the spherical content is presented on an application running on client 106. For example, the content is placed around a camera and the user is situated inside the cube and can view the content in 360 degrees. Due to the pre-processing, the rendered 3D video avoids artifacts at the edge boundaries of the cube structure.

Pre-processing

Video pre-processor 108 arranges the six face images into a rectangular two-dimensional image referred to as sheet 200. For example, video pre-processor 108 may arrange six square face images in a cube map on sheet 200. Video pre-processor 108 arranges the face images edge-to-edge giving priority in the alignment to face images that improve the decoding. For example, video pre-processor 108 attempts to keep as many edges that naturally are close to each other on the cube next to each other on sheet 200. This allows encoder 110 to encode movements across the edges better. Also, video pre-processor 108 gives the main horizon faces (e.g., the left, right, front, and top faces) priority when arranging the edges as this is where most users will look toward most of the time. In one embodiment, video pre-processor 108 always sets the left, right, front, and top face images in the same positions for images in the entire video. In another embodiment, video pre-processor 108 may analyze the content at the edges for each of the face images to determine which edges have content that are most similar by comparing characteristics of the content to a threshold (e.g., the characteristics for content from two face images are similar within a threshold). Video pre-processor 108 can then arrange those face images that have edges with similar content together in sheet 200.

Figure 2A:
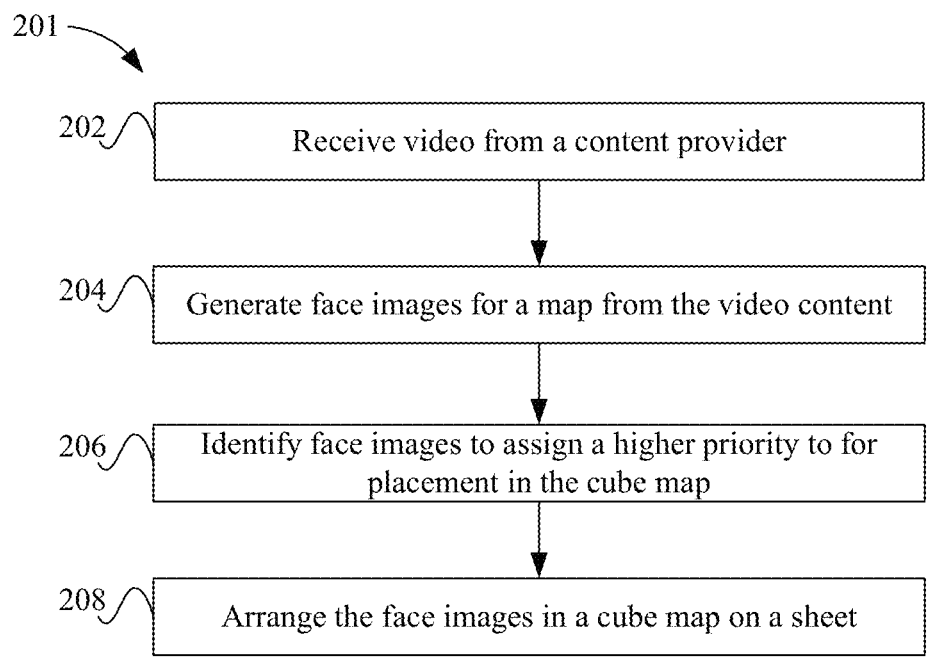
FIG. 2A depicts a simplified flowchart of a method for pre-processing the spherical content according to one embodiment.

FIG. 2A depicts a simplified flowchart 201 of a method for pre-processing the spherical content according to one embodiment. At 202, encoding system 102 receives video from a content provider. For example, the video may include a video offered by the video delivery service, such as a movie or television show. Additionally, the video may be a video for a video game being offered. The video may include spherical content that is provided in a first format, such as rectangular 2D images in an "equirectangular" format. The spherical content is content meant to be displayed in a 360 degree environment. Although the equirectangular format is described, other formats may also be received, such as standard video that is not in a spherical format.

At 204, video pre-processor 108 generates face images for a map from the video content. The face images are generated for mapping to an object. For example, video pre-processor 108 generates six face images for the six faces of a cube. The following will use the example of six face images that are mapped to six faces of a cube, but it will be understood that a different number of face images could be used and a different structure than a cube may be used, such as more than six face images may be generated for a structure that has more than six faces or a spherical structure with no edges may be used. In one embodiment, the video received may be transformed into six face images that may correspond to a cube map. For example, the equirectangular content is used to generate the face images for the left, right, front, back, top, and bottom faces of the cube. This may surround a user with face images in those directions providing a 360 degree environment. The transformation from the equirectangular format to the face images removes the distortions in the equirectangular format. Removal of the distortions improves the encoding quality.

At 206, video pre-processor 108 identifies face images to assign a higher priority to for placement in the cube map. A cube map is an arrangement of the face images on a sheet, such as a rectangular sheet. Some face images may have edges that have content that is similar to content on the edges of another face image. Also, some edges on a face image may not have content that is similar to edges of another face image. The face images that have edges that have similar content may have natural boundaries that are together and these face images are given priority in placement together. Also, video pre-processor 108 may give priority to face images that may be more likely to be viewed by a user, such as a user may be more likely to view the left, front, right, and back face images for some applications. Video pre-processor 108 may select face images that have priority and attempt to arrange the edges of these face images together.

Figure 2B:
FIG. 2B shows an example of a sheet according to one embodiment.

At 208, video pre-processor 108 arranges the face images in a cube map on a sheet. For example, the sheet may include six positions in which the six face images for the cube map are placed. In one example, the left, front, right, and top face images may be aligned with edges that have similar content aligned together. FIG. 2B shows an example of a sheet 200 according to one embodiment. At 202-1, the left face image is shown; at 202-2, the front face image is shown; at 202-3, the right face image is shown; and at 202-4, the top face image is shown. As can be seen, the content at the edges between these face images may be similar. For example, at 204-1, the content at the boundaries of the left face image and the front face image edges are aligned. Similarly, at 204-2, the content at the boundaries of the front face image and the right face image edges are aligned. At 204-3, the content at the boundaries of the front face image and the top face image edges are aligned.

There may be some face images where the edges may not include similar content. For example, at 202-5, the back face image is shown and at 202-6, the bottom face image is shown. An edge at 204-4 between the back face image and the left face image does not include similar content. At 204-5, edges between the back face image and the top face image also do not include similar content. Similarly, at 202-6 and 202-7, edges between the bottom face image and the top face image and the bottom face image and the right face image, respectively, do not include similar content.

One issue that may result is encoding artifacts appear at face image boundaries that are not naturally next to each other on the cube map. As discussed above, when arranging the face images on sheet 200, there are a number of edges for face images that are placed next to edges for other face images that do not actually have any contact with each other in the resulting cube. This may result in some cross-talk between face images that are neighboring and may lead to artifacts bleeding from one face image to another face image. This may not be an issue if the face images are natural neighbors in the cube. However, if these face images are not natural neighbors in the cube, then the face images may contain very different looking material and the bleeding artifacts may be noticeable by users during playback of the video.

Figure 3A:
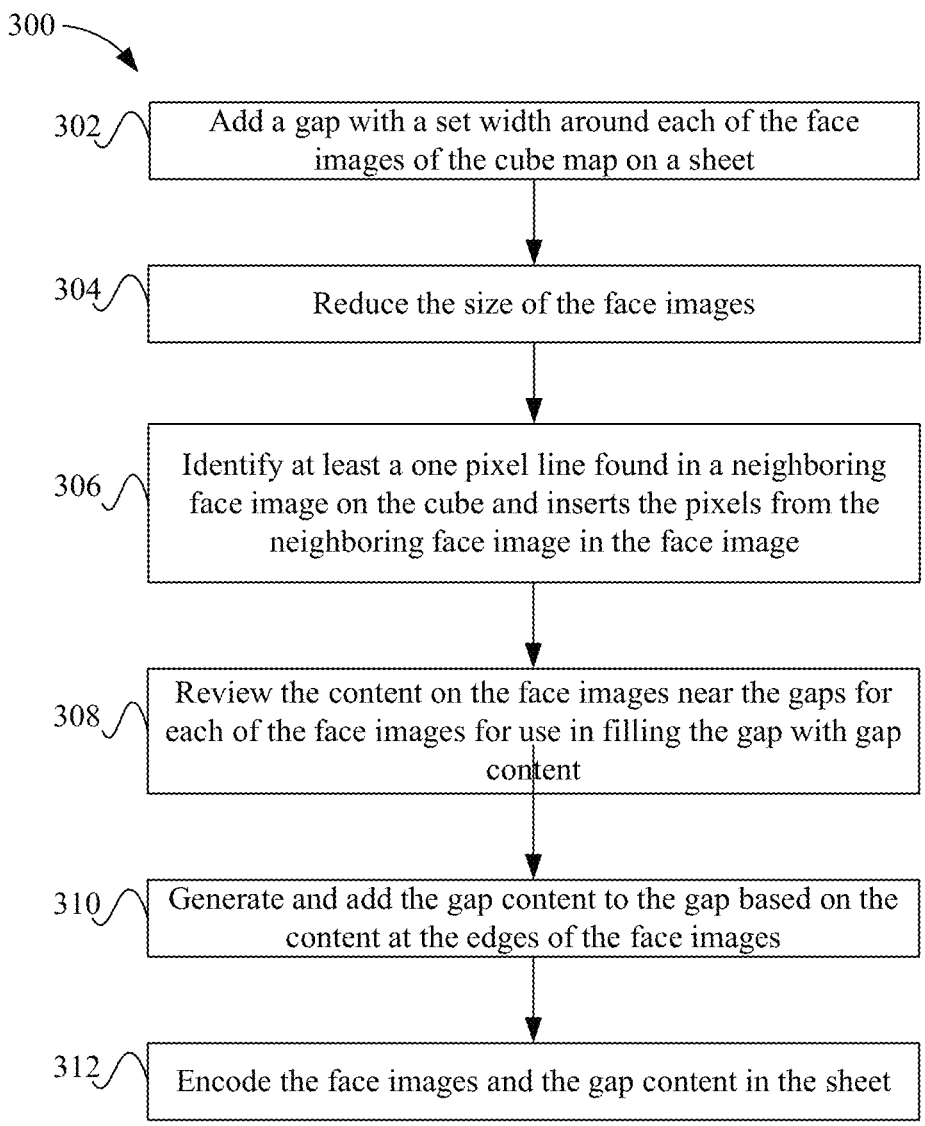
FIG. 3A depicts a simplified flowchart of a method for placing face images on sheet 200 according to one embodiments.

To minimize the bleeding of artifacts, particular embodiments may perform the following method. FIG. 3A depicts a simplified flowchart 300 of a method for placing face images on sheet 200 according to one embodiments. At 302, video pre-processor 108 adds a gap with a set width around each of the face images of the cube map on sheet 200. In one embodiment, the gap may be the width of a single block, such as 16×16 pixels. This may be the size of a block that is used by encoder 110 to encode the video. Other widths may also be used.

Figure 3B:
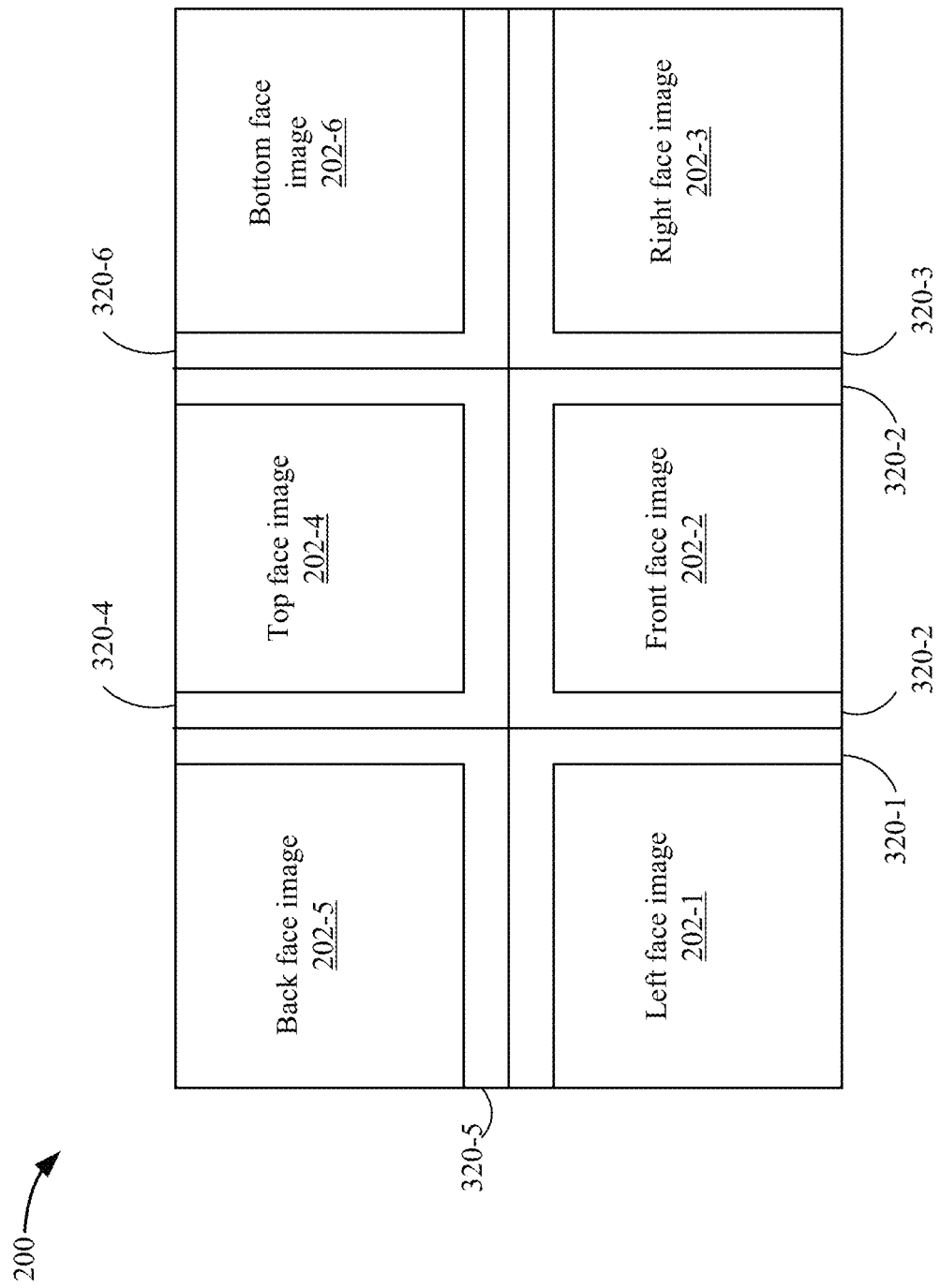
FIG. 3B shows an example of gaps on sheet according to one embodiment.

FIG. 3B shows an example of gaps on sheet 200 according to one embodiment. The face images in FIG. 2B also had gaps added; however, the gaps are hard to see because the gap content is similar to the content along the edges of the face images. Accordingly, FIG. 3B shows where the gaps are located in sheet 200 according to one embodiment.

In one embodiment, video pre-processor 108 adds gaps only between edges that have a neighbor. For instance, gaps are not added to edges on the outside of sheet 200. However, wherever edges are neighbors, video pre-processor 108 adds a gap. This leads to gaps 320-1-320-6 to be added to sheet 200. Gaps 320-1-320-6 may extend the respective face images. For example, gap 320-1 is added to face image 202-1, gap 320-2 is added to face image 202-2, and so on. Also, face images 202-1-202-6 have been resized to fit into sheet 200 with the gaps.

Referring back to FIG. 3A, at 304, video pre-processor 108 reduces the size of the face images. This resizing may happen before or after the gaps are added, but before gap content is added to the gaps. In one embodiment, the size of the face images may have been reduced when the equirectangular content was converted into the face images. In another embodiment, video processor 108 reduces the size of the face images to fit on the dimensions of sheet 200 with the gap added. The face images may be resized to accommodate the addition of content that will be later used in a filtering process.

In one embodiment, during rendering, a filtering process may need to use pixels from a neighboring face image. Because the gap has been added, the filtering process is not able to reach the pixels on a neighboring frame. To overcome this, at 306, video pre-processor 108 identifies at least a one pixel line found in a neighboring face image on the cube and inserts the pixels from the neighboring face image in the face image. The one or more frame lines are taken from the edge of the neighboring face that would naturally neighbor the face being processed. This basically makes the pixels "continue" into the naturally neighboring face on the current face image. The current face image may be resized to accommodate the one or more pixel lines. That is, the current face image is resized based on including the pixel line and the gap content. In one embodiment, encoder 110 uses a block size, such as 16×16 blocks, for encoding. To avoid various types of artifacts, video pre-processor 108 aligns the gap sizes and face image sizes (e.g., the actual face image, extra pixel lines, and gap content) to multiples of 16 in width/height. As a logical consequence, the gap and face image positions on the sheet are hence also aligned.

In one example, the filtering itself needs just one neighbor pixel. However, the decoding process may use mip-maps, which are miniaturized versions of sheet 200. This causes the need for a more than one pixel line in the face images because of the miniaturization. That is, there needs to be at least a single pixel line from the neighboring face image in the current face image, and more pixels from the neighboring face need to be added to the current face image to compensate for the miniaturization. If two mip-maps are used, to retain at least one pixel of additional data in the smallest mip-map, the current face need four pixels in the largest face image (e.g., the one in sheet 200). If different numbers of mip-maps are used, then the number of pixel lines from the neighboring face will vary.

Figure 3C:
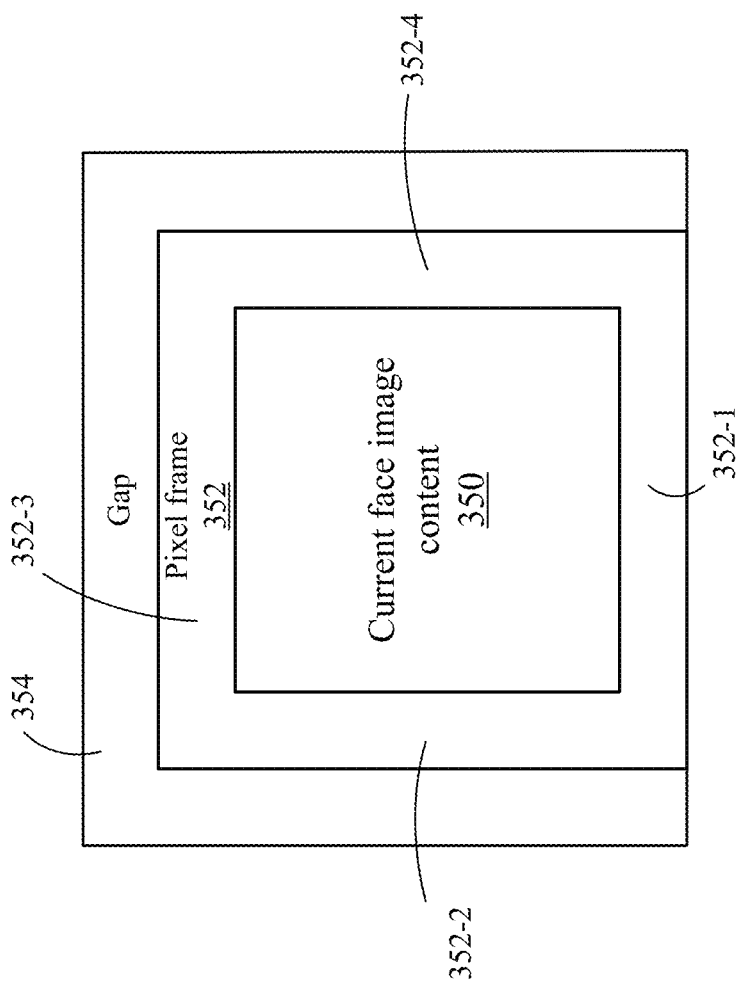
FIG. 3C depicts an example of the adding of pixel lines to a current face image according to one embodiment.

FIG. 3C depicts an example of the adding of pixel lines to a current face image according to one embodiment. In this example, the front face is shown, but other face images are also resized. The current face image has been resized to be smaller and includes the current face image content 350. A pixel frame 352 has been inserted in the area that was voided by the resizing. The pixels in the pixel frame come from the neighboring face that is adjacent to the front face on the cube structure. This is why a frame around the front face image is formed even though the front face image on sheet 200 does not have a neighboring face image below it on sheet 200. In one example, at 352-1, the pixels from the neighboring bottom face image are included, at 352-2, the pixels from the neighboring left face image are included, at 352-3, the pixels from the neighboring top face image are included at 352-4, the pixels from the neighboring right face image are included. It is noted that since each face image includes content from a neighboring face, the content in pixel frame 352 needs to be taken from the current face image content 350 of the neighboring face, and not the edge of the face image on sheet 200.

Referring back to FIG. 3A, at 308, video pre-processor 108 reviews the content on the face images near the gaps for each of the face images for use in filling the gap with gap content. For encoding, the gap needs to be filled with information. The gap content is selected to minimize the artifacts in the decoded face image. In one embodiment, the gap content may be generated based on the content near that portion of the gap. For example, the gap content may be a smeared-out color of the pixels or extruded from the pixels around the edges of the face image. This color may change as the color of the pixels around the edges changes. As extruded color may be based on the content from the original face image, the content from the neighboring face image (because it was added in the pixel frames), or both. Using a color based on the content near the gap may allow for more efficient encoding because of the similarities that encoder 110 can leverage.

Referring back to FIG. 3A, at 310, video pre-processor 108 generates and adds the gap content to the gap based on the content at the edges of the face images.

The blocks in sheet 200 that actually contain content from the video and not gap content can be decoded and displayed without the influence of the gap content. Additionally, any bleeding artifacts that occur in the decoded image are limited to the data found in the gap, which renderer 116 does not display.

The alignment constraints may lead to some areas on sheet 200 being unused. Particular embodiments exploit the unused areas to increase image resolution. The cube maps may use square face images to represent each face. Also, the same number of pixels may be mapped to each access. Renderer 116 may disregard this limitation and may use a different number of pixels for each axis. This makes the face images non-square. Renderer 116 may adjust the texture mapping at rendering time to compensate for the non-square images. Encoder 110 can encode non-square images for each face image, which may yield better use of the available image resolutions yielding more resolution per face.

At 312, encoder 110 encodes the face images and the gap content in sheet 200. The addition of the gap content may require that additional data be encoded, but due to the gap content's low information content, encoder 110 can compress the content efficiently. The gains achieved by limiting the bleeding artifacts outweigh the costs of the additional data. It is noted that encoder 110 encodes sheet 200 as it would normally encode the video without the gaps included. That is, the operation of encoder 110 does not need to be changed to encode sheet 200 with the gaps included.

After encoding sheet 200, encoder 110 provides the encoded video to video server 104. Video server 104 can then send the encoded video over a network to client 106. Although video server 104 is discussed as sending video over a network, it will be understood that encoding system 102 and video server 104 may be located in client 106. That is, the video does not need to be streamed over a network and client 106 may perform the functions described with respect to encoding system 102 and video server 104.

Decoding

At the time of video playback, the encoded video stream is decoded and presented to renderer 116 as a single two-dimensional (2D) image. Renderer 116 can then generate the 360 degree environment by placing the face images on a cube. The following will describe the decoding in more detail.

Figure 4:
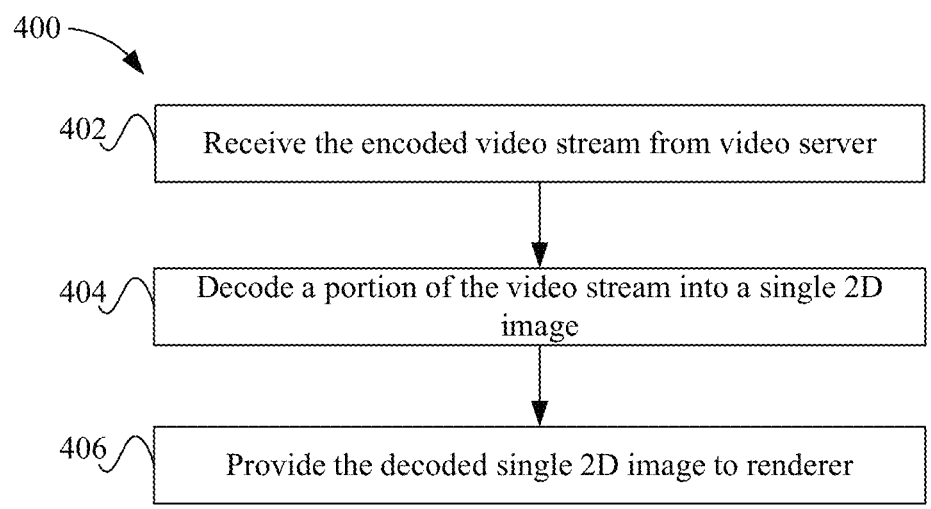
FIG. 4 depicts a simplified flowchart of a method for decoding the encoded video stream according to one embodiment.

FIG. 4 depicts a simplified flowchart 400 of a method for decoding the encoded video stream according to one embodiment. This method may be performed for each image (e.g., frame) of the video. At 402, decoder 114 receives the encoded video stream from video server 104. At 404, decoder 114 decodes a portion of the video stream into a single 2D image. The single 2D image may include the face images and the gap content of sheet 200, and represents a single image or frame of the video. The following process may be performed multiple times for each image of the video.

At 406, decoder 114 provides the decoded single 2D image to renderer 116. The 2D image is not displayed as a 2D image by client 106. Rather, the face images from the sheet are placed on faces of the cube structure. In one embodiment, the 2D image is converted into whatever binary representation hardware 112 requires. In some embodiments, this may be avoided as the renderer can process the 2D image as a 2D image is typically rendered. Renderer 116 may perform some actions with the 2D image before displaying the face images on the cube, such as generating mip-maps, which will be described below.

Rendering

Figure 5:
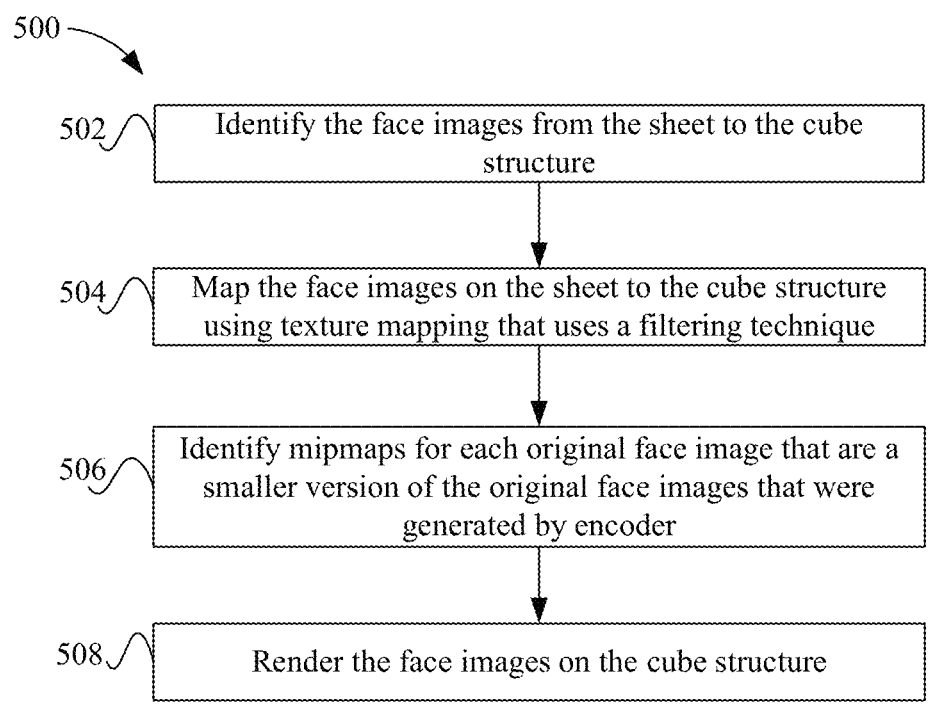
FIG. 5 depicts a simplified flowchart of a method for displaying spherical content on a cube structure directly from the 2D image according to one embodiment.

FIG. 5 depicts a simplified flowchart 500 of a method for displaying spherical content on a cube structure directly from the 2D image according to one embodiment. In one embodiment, renderer 116 uses texture mapping techniques to render the face images on the cube structure. The cube structure may form a 360 degree environment around a point, such as a camera, representing the user's orientation in space. That is, the user may be situated inside the cube and can view the face images of the cube structure. At 502, renderer 116 identifies the face images from sheet 200 to the cube structure. In one embodiment, each video steam uses a constant layout of face images for all frames. The layout may be included in metadata for the video stream. Renderer 116 may determine where the face images are and where the gap content is located on sheet 200. Renderer 116 may use pre-set coordinates to determine where the face images are located on sheet 200. Alternatively, the coordinates may be sent in a metadata with the encoded video stream.

At 504, renderer 116 maps the face images on sheet 200 to the cube structure using texture mapping that uses a filtering technique, such as bi-linear filtering. The bi-linear filtering may provide a high quality rendering and requires a number of pixels, such as four pixels, to perform the filtering. The texture sampling techniques sample up to one pixel around the actual pixel being requested to do filtering to increase the rendering quality. At the edges of each face images area, an additional pixel to read from the neighboring face image is needed to avoid any artifacts. If the gaps were not inserted in sheet 200, then the bi-linear filtering would have naturally sampled pixels from the neighboring face image. However, because of the gap, the a one pixel line that was inserted in the gap can be used for bi-linear filtering. Renderer 116 uses the one pixel line found in each face image from the neighboring face image when performing bi-linear filtering at the edge of the face image. The use of the one pixel line from the neighboring face image avoids any artifacts in the rendered video because the bi-linear filtering process performs as expected.

In addition to the bi-linear sampling issues described above, some minification may occur when renderer 116 renders the images mapped to the cube structure. The minification is a type of anti-aliasing (AA), where texture samples exist at a higher frequency than required for the sample frequency needed for texture fill. This results in aliasing artifacts in the images on the cube. To compensate for the minification issues, at 506, renderer 116 may identify mip-maps for each original face image that are a smaller version of the original face images that were generated by encoder 110. The mip-maps can be used by renderer 116 to perform texture mapping to avoid the aliasing that may result from minification. Encoding system 102 may use two additional mip-maps for sheet 200. The face image on sheet 200 included pixels from neighboring cube map face images at a width of four pixels as discussed above. This results in 1 pixel still being available at the smallest mip level as each mip level is half the dimension on each axis. The mip-maps generated may be half-sized (each axis, so quarter-sized as the number of pixels goes) versions of each higher mip-maps. If sheet 200 is 2048×1024 pixels, then the mip-maps may be 1024×512 and 512×256 pixels. This provides the smallest mip-map with a single pixel line. The largest, sheet 200, may have four pixel lines from a neighboring face, but only 1 pixel line is needed and the other 3 pixel lines can be ignored. Similarly, the bigger mip-map includes 2 pixel lines from the neighboring face and one of the pixel lines can be ignored.

At 508, renderer 116 renders the face images on the cube structure. Renderer 116 does not render the gap content from sheet 200. This leaves just the face images. For example, renderer 116 uses coordinates for the face images and can map the face images to the cube faces without rendering the gap content or the content from the pixel frame. The user sits in the center of a virtual cube structure, and as each side of the cube is streamed in, the face image is projected into 3D space, which gives an illusion of every pixel having an equal distance from the user.

Stereoscopic Content

Figure 6:
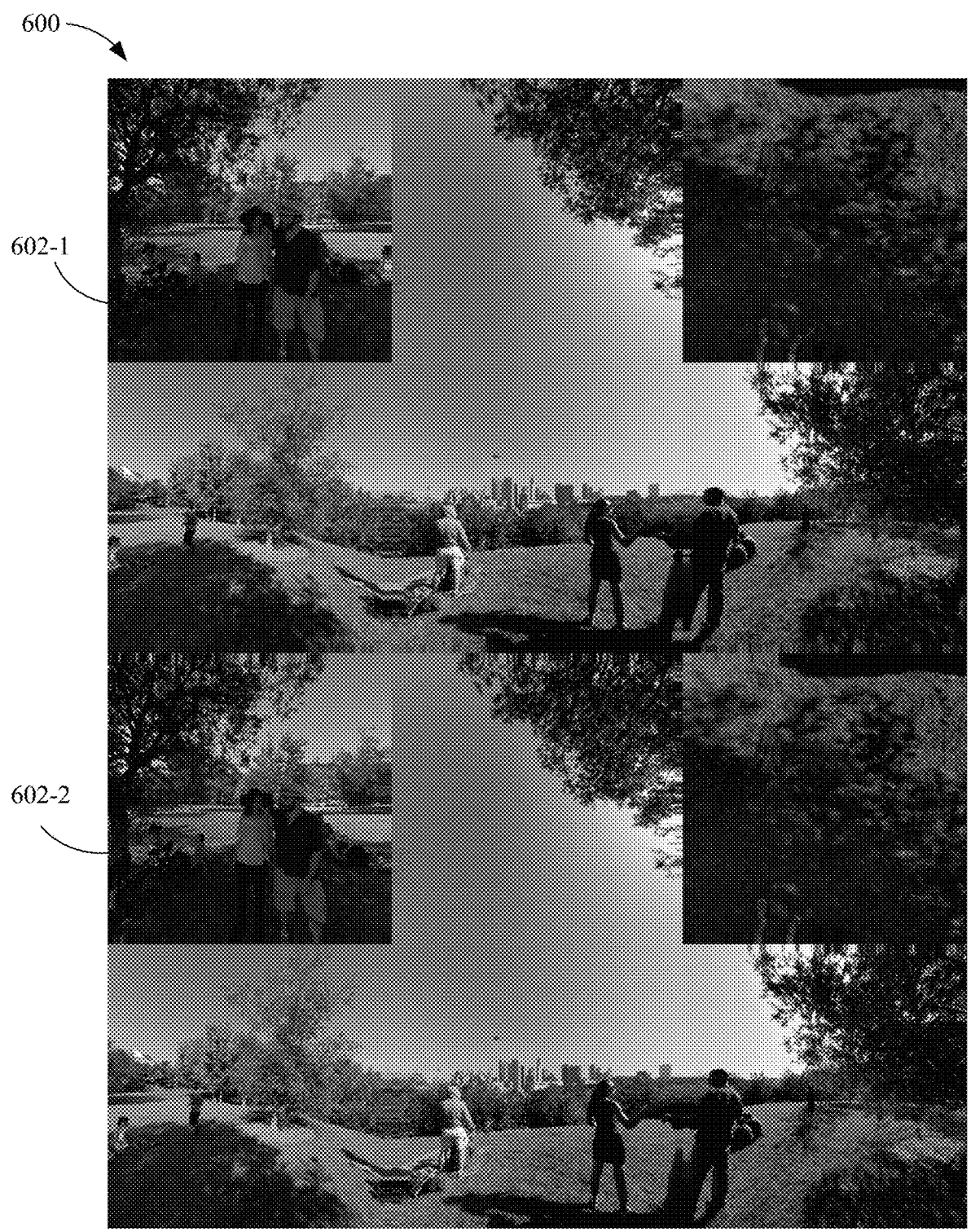
FIG. 6 shows an example of two sheets for two eyes, respectively, according to one embodiment.

Particular embodiments may also provide stereoscopic content, which provides independent images for both eyes. FIG. 6 shows an example of two sheets 602-1 and 602-2 for two eyes, respectively, according to one embodiment. Encoder 110 may exploit the similarities within the single sheet 600. Thus, the addition of the second eyes image does not double the needed bandwidth. This is because the face images for both eyes are placed on a single sheet 600 that encoder 110 can encode together. This increases the compression that encoder 110 can achieve compared to if each eye was compressed as an independent sheet.

Decoder 114 can then decode the encoded video stream into a single 2D image. Renderer 116 renders the respective cube maps for each eye on separate cube structures for each eye. For example, the cube map at 602-1 is rendered on a first cube structure, and the cube map at 602-2 is rendered on a second cube structure.

The alignment of the sides of the face image and added gaps between them avoids encoding artifacts at the edge boundaries. The re-sample from equirectangular to the cube map format avoids distortions. The arrangement of face images on sheet 200 maximizes the encoding gains. The face images are downsized slightly to allow for additional pixels to allow for the use of bi-linear filtering at render time. The rendering directly from a single flat texture avoids additional conversion work at rendering time. Stereoscopic material naturally fits into the above encoding schemes. Also, anamorphic cube face image encoding also increases the available resolution.

System

Figure 7:
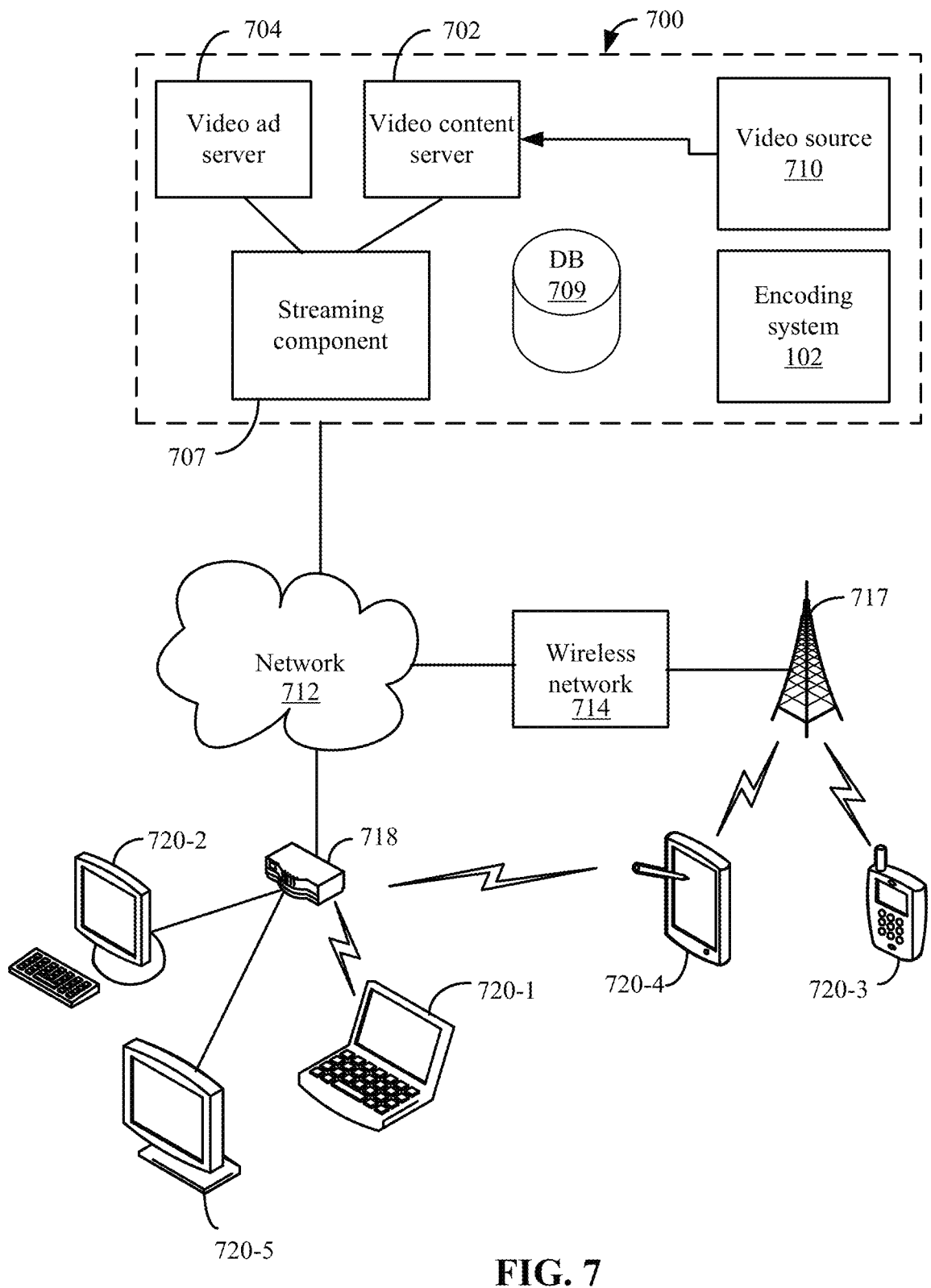
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include encoding system 102112.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless telephony network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
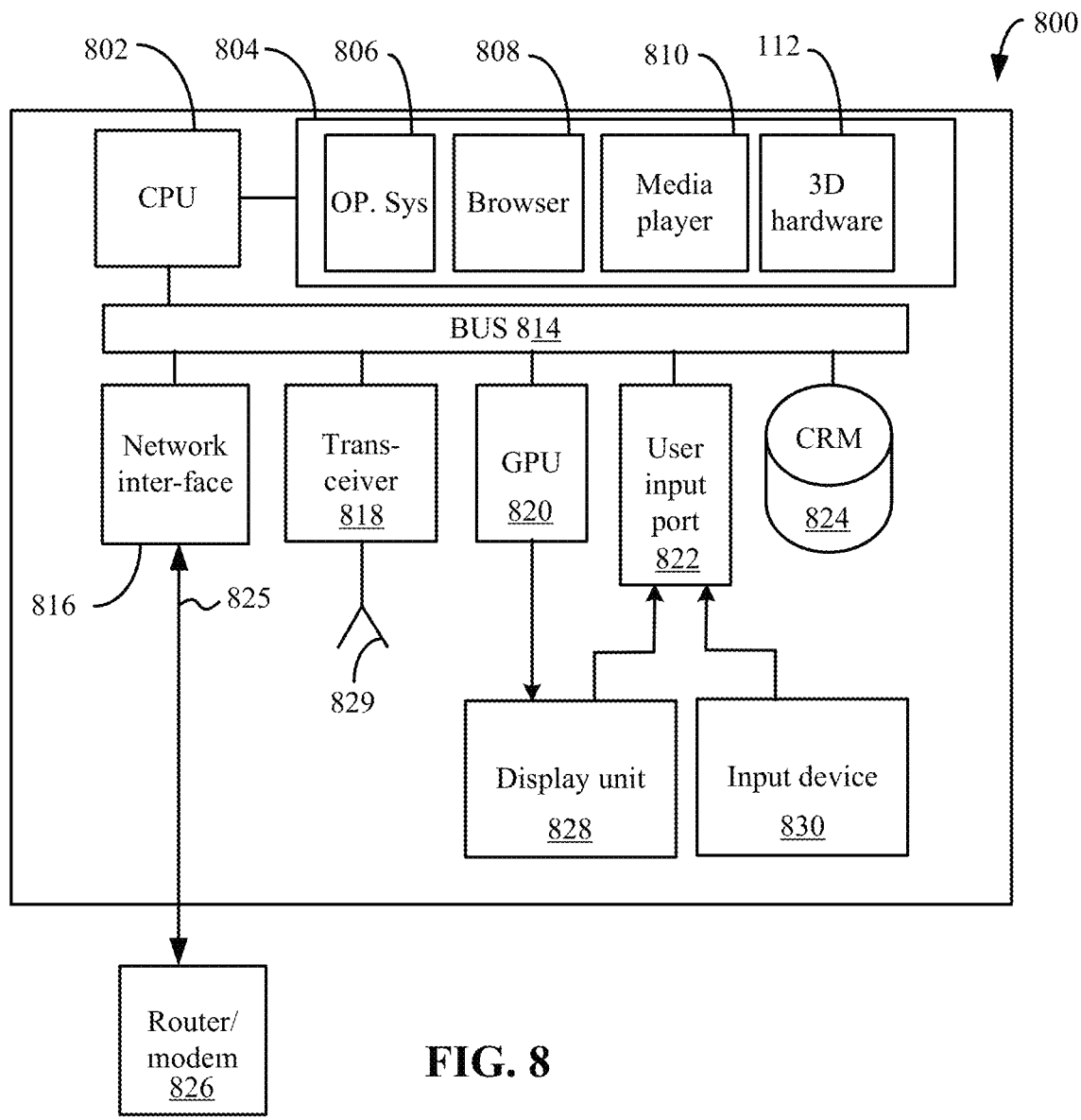
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 808 for handling system functions such as input/output and memory access, a browser 808 to display web pages, and media player 810 for playing video. The modules may further include 3D hardware 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium (CRM) in a storage device 824 may be connected to the bus 814 and store static information and instructions for the processor 802; for example, the storage device (CRM) 824 may store the modules 806, 808, and 810 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 800, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
reducing, by a computing device, a size of a plurality of face images from spherical content on a two dimensional sheet, wherein one or more face images are positioned next to each other based on an associated position of the one or more face images on an object structure, and wherein edges of the one or more face images are reduced from being next to each other to having a plurality of gaps in between the edges of the one or more face images;
adding, by the computing device, a pixel frame around each of the plurality of face images on the sheet, the pixel frame including pixels from a neighboring face image on the object structure;
adding, by the computing device, gap content in the plurality of gaps, wherein the gap content is based on content near to respective gaps in the plurality of gaps; and
encoding, by the computing device, the plurality of face images, the pixel frame, and the gap content on the sheet, wherein the plurality of face images are decodable using the pixel frame and the gap content for placement on the object structure to display the spherical content.

2. The method of claim 1, wherein:
the plurality of face images comprise six face images, and
the object structure includes a cube structure with six sides.

3. The method of claim 1, wherein the object structure displays the spherical content around a point associated with a user viewing a video.

4. The method of claim 1, wherein the plurality of face images are positioned on the sheet by performing:
selecting a set of face images designated with having a priority; and
positioning the set of face images with natural boundaries next to each other on the sheet.

5. The method of claim 4, wherein the set of face images comprises a front face image, a left face image, a right face image, and a top face image.

6. The method of claim 1, wherein:
the spherical content is in an equirectangular format,
the sheet includes the plurality of face images in a two dimensional format, wherein the sheet in the two-dimensional format is encoded, and
the object structure displays the plurality of the face images in a three dimensional format.

7. The method of claim 1, wherein gaps in the plurality of gaps are only added in between neighboring edges of face images on the sheet.

8. The method of claim 1, wherein adding the gap content in the plurality of gaps comprises:
adding a first color to pixels in the gap based on a second color of pixels near to the pixels in the gap next to a face image.

9. The method of claim 8, wherein the pixels near to the pixels in the gap have been added to the face image from a neighboring face image in the pixel frame.

10. The method of claim 1, wherein the gap content is used to perform filtering on a first face image to render the face image on the object structure.

11. The method of claim 1, wherein the gap content is not rendered on the object structure.

12. The method of claim 1, wherein:
the pixel frame surrounds each face image in the plurality of face images, and
each face image includes a gap only in between edges of the plurality of face images that are neighboring on the sheet.

13. The method of claim 1, wherein:
decoding of the sheet generates a set of miniaturized face images for use in filtering of the face images, and
a size of the pixel frame is based on a number of the set of miniaturized face images needed such that at least a single pixel frame is included in a smallest of the set of miniaturized face images.

14. The method of claim 1, wherein:
the two dimensional sheet includes a first set of face images for a first eye and a second set of face images for a second eye, the object structure comprises a first object structure and a second object structure, and the first set of face images are placed on the first object structure for the first eye and the second set of images are placed on the second object structure for the second eye.

15. The method of claim 14, wherein encoding the plurality of face images, the pixel frame, and the gap content on the sheet uses content across the first set of face images and the second set of face images to optimize encoding.

16. The method of claim 1, wherein at least one of the face images uses a different number of pixels from another face image.

17. A non-transitory computer-readable storage medium containing instructions, that when executed, control a computer system to be configured for:

reducing a size of a plurality of face images from spherical content on a two dimensional sheet, wherein one or more face images are positioned next to each other based on an associated position of the one or more face images on an object structure, and wherein edges of the one or more face images are reduced from being next to each other to having a plurality of gaps in between the edges of the one or more face images;

adding a pixel frame around each of the plurality of face images on the sheet, the pixel frame including pixels from a neighboring face image on the object structure;

adding gap content in the plurality of gaps, wherein the gap content is based on content near to respective gaps in the plurality of gaps; and encoding the plurality of face images, the pixel frame, and the gap content on the sheet, wherein the plurality of face images are decodable using the pixel frame and the gap content for placement on the object structure to display the spherical content.

18. A method comprising:

receiving, by a computing device, an encoded sheet for spherical content for a video, wherein the encoded sheet includes a plurality of face images from the spherical content to represent an image in the video, edges of one or more face images in the plurality of face images are reduced from being next to each other to having a plurality of gaps in between the edges of the one or more face images; gap content in the plurality of gaps on the sheet in between edges of the plurality of face images that are neighboring, and a pixel frame around each of the plurality of face images on the sheet, the pixel frame including pixels from a neighboring face image on an object structure;

performing, by the computing device, a decoding process for the encoded sheet, the decoding process performing:

generating, by the computing device, a set of miniaturized face images, wherein each miniaturized face image in the set of miniaturized face images includes at least a single pixel frame from the pixel frame around each of the plurality of face images on the sheet;

performing, by the computing device, filtering of the plurality of face images on the sheet, wherein filtering uses the pixel frame in the set of miniaturized faces from the sheet; and rendering, by the computing device, the plurality of face images on the object structure to display the spherical content, wherein artifacts that exist in the gap due to the decoding process are not rendered on the object structure.

19. The method of claim 18, wherein a size of the pixel frame is based on a number of the set of miniaturized face images needed such that at least a single pixel frame is included in a smallest of the set of miniaturized face images.

20. The method of claim 18, wherein the gap content minimizes artifacts in the decoding process.

21. The method of claim 1, further comprising:

sending the encoded sheet to a decoder, wherein the plurality of face images are decoded by the decoder using the pixel frame and the gap content for placement on the object structure to display the spherical content.

* * * * *